United States Patent
Wang et al.

(10) Patent No.: US 10,389,848 B2
(45) Date of Patent: Aug. 20, 2019

(54) MESSAGE TRANSMISSION METHOD AND CORE NETWORK INTERFACE DEVICE

(71) Applicant: HUAWEI TECHNOLOGIES CO., LTD., Shenzhen (CN)

(72) Inventors: Yuan Wang, Shanghai (CN); Jingwang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/118,458

(22) Filed: Aug. 31, 2018

(65) Prior Publication Data
US 2018/0375961 A1    Dec. 27, 2018

Related U.S. Application Data

(63) Continuation of application No. PCT/CN2016/075128, filed on Jan. 3, 2016.

(51) Int. Cl.
| | |
|---|---|
| *H04L 29/08* | (2006.01) |
| *H04L 12/46* | (2006.01) |
| *G06F 9/44* | (2018.01) |

(52) U.S. Cl.
CPC .............. *H04L 67/327* (2013.01); *G06F 9/44* (2013.01); *H04L 12/4633* (2013.01); *H04L 29/08* (2013.01); *H04L 69/329* (2013.01)

(58) Field of Classification Search
CPC ....... G06F 9/44; H04L 12/4633; H04L 29/08; H04L 67/327; H04L 69/329; H04W 88/02; H04W 60/00
See application file for complete search history.

(56) References Cited

U.S. PATENT DOCUMENTS 8,990,326 B2 *   3/2015   Banks .................... H04W 4/14
                                                        709/206
9,882,993 B2 *   1/2018   Chastain ................ H04L 67/16
(Continued)

FOREIGN PATENT DOCUMENTS

CN    101640814 A    2/2010
CN    103634355 A    3/2014
(Continued)

*Primary Examiner* — Liton Miah
(74) *Attorney, Agent, or Firm* — Kilpatrick Townsend & Stockton LLP

(57) ABSTRACT

A message transmission method and a core network interface device are provided, so as to reduce complexity of a communication interaction between a core network and each external entity. After receiving a request message from a service instance, obtains device indication information of a target device, an identifier of the service instance, and a type of a response message corresponding to the request message; after sending the request message and receiving a to-be-forwarded response message, obtains a type of the to-be-forwarded response message and device indication information of a device that sends the to-be-forwarded response message; sends the to-be-forwarded response message to the service instance when the type of the to-be-forwarded response message and the device indication information of the device that sends the to-be-forwarded response message respectively match the type of the response message and the device indication information of the target device that correspond to the request message.

18 Claims, 9 Drawing Sheets

(56) References Cited

U.S. PATENT DOCUMENTS

| | | | |
|---|---|---|---|
| 2010/0027774 A1 | 2/2010 | Capuozzo et al. | |
| 2010/0030881 A1* | 2/2010 | Moreira Sa de Souza | ............... H04L 29/08846 709/223 |
| 2015/0381429 A1* | 12/2015 | Wu | ............... H04L 41/12 709/223 |
| 2016/0007138 A1* | 1/2016 | Palanisamy | ............... H04W 4/70 455/41.2 |

FOREIGN PATENT DOCUMENTS

| | | |
|---|---|---|
| CN | 104735401 A | 6/2015 |
| EP | 1901526 A1 | 3/2008 |
| EP | 2169550 A1 | 3/2010 |
| EP | 2273721 A1 | 1/2011 |

* cited by examiner

MESSAGE TRANSMISSION METHOD AND CORE NETWORK INTERFACE DEVICE

CROSS-REFERENCE TO RELATED APPLICATIONS

This application is a continuation of International Application No. PCT/CN2016/075128, filed on Mar. 1, 2016, the disclosure of which is hereby incorporated by reference in its entirety.

TECHNICAL FIELD

This application relates to the field of communications technologies, and in particular, to a message transmission method and a core network interface device.

BACKGROUND

Currently, a network element (NE)-based architecture is used in an evolved packet core (EPC) network. Typical network elements included in the architecture include a mobility management entity (MME), a serving gateway (Serving Gateway, S-GW), a packet data network gateway (P-GW), and the like. Currently, by using a service feature and processing logic that are built into a network element and a procedure message between network elements, the EPC network implements corresponding network functions, for example, implements functions such as mobility management, bearer management, and location management.

With continuous expansion of business models and continuous development of mobile communications technologies, a user business needs more service models and better service features, and therefore brings a requirement for a new network function. Network functions provided by a conventional EPC network are built into and distributed on network elements. Therefore, if a new network function is introduced in the EPC network to support a service requirement of a user, the EPC network needs to redefine and redesign processing logic and a procedure interaction of the network elements. However, a network element architecture of the conventional EPC network has difficulty in supporting network function extension. It is difficult to dynamically adjust, for example, newly add, update, or delete, a network function based on ever-changing user requirements, and it is difficult to meet a requirement of the user for a new use case.

For this purpose, a service-oriented architecture (SOA) may be used in a mobile communications network to resolve the foregoing problem. A basic architecture of the SOA is designed based on principles of function isolation and service layering. As shown in FIG. 1, a network function may be divided into a service consumer layer, a business process layer, a service layer, a service component layer, and an operating system layer. A service consumer may customize a needed service, such as a first service requested by a user shown in FIG. 1. Then a service chain in a business process is formed. The service chain then selects a proper service by using the service layer. A corresponding service component is determined based on the selected service. Then an application in the operating system layer is determined based on the determined service component. Finally, the network function is implemented by using the application.

The SOA can associate, by using interfaces and protocols defined among a plurality of service units, the service units that implement a network function; but is independent of a device, a hardware platform, an operating system, and a programming language that implement the network function. Therefore, a loose coupling feature of the SOA enables the mobile communications network to dynamically adjust, for example, newly add, update, or delete, a network function in the mobile communications network in a modular manner.

However, in the mobile communications network in which the SOA is used, when a network function is implemented, a core network and each external entity need to interact with each other by using a protocol. There are many types of interaction protocols, such as the S1 Application Protocol (S1 AP), the non-access stratum (NAS) protocol, the Diameter protocol, or the General Packet Radio System (GPRS) Tunneling Protocol (GTP). In addition, to enable the core network to complete a network function, in a business processing process, a service component in the core network needs to perform a plurality of message interactions with an external entity, and different interaction protocols are used in different message interactions. As a result, the service component needs to implement and maintain a plurality of protocol interfaces, thereby resulting in high design complexity of the service component and increasing difficulty of maintenance in a late phase.

SUMMARY

Embodiments of the present invention provide a message transmission method and a core network interface device, so as to reduce complexity of a communication interaction between a core network and each external entity.

According to an aspect, an embodiment of the present invention provides a message transmission method. The method includes: receiving, by a core network interface device disposed in a core network, a request message sent by a service instance in the core network; obtaining an identifier of the service instance that sends the request message, and a type of a response message and device indication information of a target device that correspond to the request message; after sending the request message to the target device, receiving, by the core network interface device, a to-be-forwarded response message, and obtaining a type of the to-be-forwarded response message and device indication information of a device that sends the to-be-forwarded response message; respectively matching, by the core network interface device, the two pieces of information with the type of the response message and the device indication information of the target device that correspond to the request message; and obtaining, by the core network interface device, the identifier of the service instance, and sending the to-be-forwarded response message to the service instance when the type of the to-be-forwarded response message and the device indication information of the device that sends the to-be-forwarded response message respectively match the type of the response message and the device indication information of the target device that correspond to the request message. The service instance may be software and hardware resources in the core network that are for implementing a network function or a subtask in the network function, and the target device may be a device that receives and responds to the request message.

By using the method, the service instance that is in the core network and that implements a network function or a subtask in the network function may directly perform a message interaction with another device outside the core network by using the core network interface device, so that complexity of a communication interaction between the core network and each external entity is reduced, and there is no need to implement and maintain a plurality of protocol interfaces in the service instance. The core network interface device supports various message interactions. Therefore, when a network function is newly added, updated, or deleted in a subsequent period, only a service instance corresponding to the network function needs to be adjusted, so that design complexity of the service instance and difficulty of maintenance in a late phase are reduced, and network scalability and flexibility are improved.

In a possible design, the core network interface device may further generate a message transmission entry that includes the obtained identifier of the service instance that sends the request message, and the obtained type of the response message and the obtained device indication information of the target device that correspond to the request message; or store the three pieces of information in another manner. The core network interface device obtains the identifier of the service instance in the message transmission entry, and sends the to-be-forwarded response message to the service instance when the type of the to-be-forwarded response message and the device indication information of the device that sends the to-be-forwarded response message respectively match the type of the response message and the device indication information of the target device that correspond to the request message and are in the message transmission entry.

In a possible design, the core network interface device obtains the identifier of the service instance in the following several manners: Manner 1: If the service instance sends the request message and the identifier of the service instance to the core network interface device when processing a business, the core network interface device receives the identifier of the service instance that is sent by the service instance that sends the request message. Manner 2: If the request message generated by the service instance includes the identifier of the service instance, after receiving the request message, the core network interface device obtains the identifier of the service instance that is included in the request message. Manner 3: If the request message sent by the service instance includes an IP address of the service instance (that is, a source IP address) when an Internet Protocol IP address is allocated to each service instance in the core network, after receiving the request message, the core network interface device obtains the source IP address in the request message, and obtains, based on a plurality of stored correspondences between an IP address and a service instance, the service instance corresponding to the source IP address, so as to determine the identifier of the obtained service instance.

In the foregoing several manners, the core network interface device may accurately and quickly obtain the identifier of the service instance, and then may generate a message transmission entry by using the identifier of the service instance, so that after subsequently receiving a response message from the target device, the core network interface device can accurately send the response message to the service instance based on the message transmission entry.

In a possible design, the core network interface device obtains, in the following several manners, the type of the response message corresponding to the request message: Manner 1: If the service instance pre-stores a plurality of correspondences between a type of a request message and a type of a response message, determines a type of the request message after processing a business and generating the request message, obtains, based on the correspondences between a type of a request message and a type of a response message that are stored in the service instance, the type of the response message corresponding to the request message, and sends the request message and the type of the response message corresponding to the request message to the core network interface device, the core network interface device receives the type that is of the response message corresponding to the request message and that is sent by the service instance. Manner 2: If the core network interface device pre-stores a plurality of correspondences between a type of a request message and a type of a response message, after receiving the request message, the core network interface device obtains a type of the request message, and determines, based on a preset correspondence between a type of a request message and a type of a response message, the type of the response message corresponding to the request message.

In the foregoing several manners, the core network interface device may accurately and quickly obtain the type of the response message corresponding to the request message, and then may generate a message transmission entry by using the type of the response message, so that after subsequently receiving a response message from the target device, the core network interface device can match a type of the response message with the message transmission entry, and accurately send the response message to the service instance when the matching succeeds.

In a possible design, the type of the response message corresponding to the request message includes at least one of a type of a normal response message and a type of an error indication response message. The normal response message is a message that is returned by a communications peer end based on a standard and that enables execution of a procedure to continue normally. The error indication response message is generally an error cause message sent when a procedure is terminated due to an unpredictable error that occurs in a communications peer end.

In a possible design, the device indication information of the target device may be any information that can uniquely identify the target device. For example, the device indication information may be either of the following: an identifier of the target device or an identifier of a channel between the core network interface device and the target device. The identifier of the target device may be information such as an IP address of the target device, an IMSI of the target device, a TMSI of the target device, a GUTI of the target device, or a domain name of the target device.

In a possible design, the device indication information of the target device is the identifier of the target device, and the core network interface device obtains the device indication information of the target device in the following several manners: Manner 1: If the service instance sends the request message and the identifier of the target device to the core network interface device when processing a business, the core network interface device receives the identifier of the target device that is sent by the service instance. Manner 2: If the request message generated by the service instance includes the identifier of the target device, after receiving the request message, the core network interface device obtains the identifier of the target device that is included in the request message.

In the two manners, the core network interface device may accurately and quickly obtain the device indication information of the target device, and then may generate a message transmission entry by using the device indication information of the target device, so that when subsequently receiving a response message, the core network interface device can match the device indication information of the target device in the message transmission entry with device indication information of a device that sends the response message; and when the matching succeeds, determine that the device that sends the response message is the target device for the request message. Therefore, the core network interface device may send the response message to the service instance.

In a possible design, the device indication information of the target device is the identifier of the channel between the core network interface device and the target device, and that the core network interface device obtains device indication information of the target device includes: The core network interface device obtains the identifier of the target device that corresponds to the request message. A specific implementation is similar to the manner in the previous design. The core network interface device retrieves, from a preset correspondence between a device identifier and a channel identifier, a channel identifier corresponding to the identifier of the target device, for example, retrieves a first correspondence that includes the identifier of the target device. When the channel identifier corresponding to the identifier of the target device is retrieved, the core network interface device uses the channel identifier as the identifier of the channel between the core network interface device and the target device. For example, when the first correspondence is retrieved, the core network interface device uses, as the identifier of the channel between the core network interface device and the target device, a channel identifier included in the first correspondence. Alternatively, when the channel identifier corresponding to the identifier of the target device is not retrieved, for example, when the first correspondence is not retrieved, the core network interface device establishes the channel between the core network interface device and the target device, and obtains the identifier of the channel between the core network interface device and the target device.

In the foregoing methods, the core network interface device may accurately and quickly obtain the device indication information of the target device, and then may generate a message transmission entry by using the device indication information of the target device, so that when subsequently receiving a response message, the core network interface device can match the device indication information of the target device in the message transmission entry with device indication information of a device that sends the response message; and when the matching succeeds, determine that the device that sends the response message is the target device for the request message. Therefore, the core network interface device may send the response message to the service instance.

In a possible design, after establishing the channel between the core network interface device and the target device in the foregoing design, the core network interface device may further establish a correspondence between the identifier of the channel and the identifier of the target device, and store the established correspondence into the preset correspondence between a device identifier and a channel identifier, so that when the service instance in the core network subsequently sends the request message to the target device, the core network interface device can directly determine the identifier of the channel by using the preset correspondence between a device identifier and a channel identifier.

In a possible design, that the core network interface device sends the request message to the target device includes: The core network interface device determines the target device based on the device indication information of the target device, and selects a corresponding first communications protocol based on a type of the target device. The core network interface device encapsulates the request message based on the first communications protocol, and sends the encapsulated request message to the target device. In the core network interface device, a plurality of types of communications protocols may be set, and a table of a correspondence between a device type and a communications protocol may be configured, so as to perform message interactions with various types of devices (such as UE, a base station, and an HSS) outside the core network. For example, if the core network interface device determines, based on the device indication information, that the target device is an evolved NodeB (eNB), the core network interface device may select a communications protocol: the S1 protocol, and then use the S1 protocol to encapsulate the request message.

By using the foregoing method, the plurality of types of communications protocols may be implemented in the core network interface device. To be specific, a plurality of protocol interfaces are implemented and maintained. Therefore, the service instance in the core network does not need to implement and maintain a plurality of protocol interfaces, and may only send the request message to the core network interface device. The core network interface device may encapsulate the request message by using a proper communications protocol, and send the encapsulated request message to the target device. The service instance in the core network does not need to implement and maintain the plurality of protocol interfaces. Therefore, when a network function in the core network is newly added, updated, or deleted, a corresponding service instance may be directly added, updated, or deleted, and a communications protocol corresponding to the network function may be newly added, updated, or deleted in the core network interface device. In this way, design complexity of the service instance is reduced, difficulty of maintenance in a late phase is reduced, and core network scalability and flexibility are enhanced.

In a possible design, that the core network interface device obtains device indication information of a device that sends the to-be-forwarded response message includes: The core network interface device determines a channel for transmitting the to-be-forwarded response message, and determines, based on the channel and a preset correspondence between device indication information and a channel, the device indication information of the device that sends the to-be-forwarded response message. In this way, the core network interface device may quickly and accurately obtain the device indication information of the device that sends the to-be-forwarded response message, so as to match the device indication information of the device for the to-be-forwarded response message with a message forwarding entry when forwarding the to-be-forwarded response message.

In a possible design, that the core network interface device obtains a type of the to-be-forwarded response message includes: The core network interface device determines, based on the obtained device indication information of the device that sends the to-be-forwarded response message, the device that sends the to-be-forwarded response message; and selects a corresponding second communications protocol based on a type of the device that sends the to-be-forwarded response message. The core network interface device decapsulates the to-be-forwarded response message based on the second communications protocol. The core network interface device obtains the type of the to-be-forwarded response message based on the decapsulated to-be-forwarded response message. Usually, in the foregoing design, the first communications protocol for encapsulating the request message and the second communications protocol for decapsulation are a same communications protocol. In this way, the core network interface device may quickly and accurately obtain the type of the to-be-forwarded response message, so as to match the type of the to-be-forwarded response message with a message forwarding entry when forwarding the to-be-forwarded response message.

In a possible design, that the core network interface device sends the to-be-forwarded response message to the service instance includes: The core network interface device sends the decapsulated to-be-forwarded response message in the foregoing design to the service instance.

In a possible design, when the type of the response message corresponding to the request message in the message transmission entry includes two types: a type of a normal response message and a type of an error indication response message, if the type of the to-be-forwarded response message is the same as any type in the message transmission entry, it indicates that the matching succeeds. In this way, it can be ensured that regardless of a specific type of the response message corresponding to the request message, the core network interface device may match the type of the response message corresponding to the request message with the message forwarding entry, and accurately send the response message corresponding to the request message to the service instance.

In a possible design, the core network interface device deletes the message transmission entry after sending the to-be-forwarded response message to the service instance. The message transmission entry is generated for the request message. Therefore, after the response message corresponding to the request message is forwarded, the message transmission entry is invalidated. After the message transmission entry is deleted, it can be ensured that each message transmission entry stored in the core network interface device is generated for one request message, and may be used to forward a unique response message corresponding to a request message. Therefore, an accuracy rate of subsequent response message forwarding may be ensured.

According to another aspect, an embodiment of the present invention provides a core network interface device. The core network interface device has a function of implementing a behavior of the core network interface device in the foregoing method examples. The function may be implemented by using hardware, or may be implemented by executing corresponding software by hardware. The hardware or the software includes one or more modules corresponding to the function.

In a possible design, a structure of the core network interface device includes a processing unit and a communications unit. The processing unit is configured to support the core network interface device in executing corresponding functions in the foregoing method. The communications unit is configured to support the core network interface device in communicating with another device. The core network interface device may further include a storage unit, and the storage unit is configured to couple to the processing unit and store a program instruction and data that are necessary for the core network interface device. In an example, the processing unit may be a processor, the communications unit may be a transceiver, and the storage unit may be a memory.

In another possible design, a structure of the core network interface device includes a receiving unit, a first obtaining unit, a generation unit, a sending unit, a second obtaining unit, and a processing unit. The units may execute corresponding functions in the foregoing method examples. For details, refer to the detailed description in the method examples. Details are not described herein.

According to still another aspect, an embodiment of the present invention provides a communications system. The system includes the core network interface device in the foregoing aspect, and the system may further include another device that interacts with the core network interface device in the solution provided in this embodiment of the present invention.

According to yet another aspect, an embodiment of the present invention provides a computer storage medium, configured to store computer software instructions used by the foregoing core network interface device. The computer software instructions include a program designed to execute the foregoing aspects.

Compared with the prior art, in the solutions provided in the embodiments of the present invention, after receiving the request message sent by the service instance, the core network interface device disposed in the core network obtains the device indication information of the target device, the identifier of the service instance, and the type of the response message corresponding to the request message. The target device is a device that receives and responds to the request message. After sending the request message to the target device, and receiving the to-be-forwarded response message, the core network interface device obtains the type of the to-be-forwarded response message and the device indication information of the device that sends the to-be-forwarded response message. The core network interface device obtains the identifier of the service instance, and sends the to-be-forwarded response message to the service instance when the type of the to-be-forwarded response message and the device indication information of the device that sends the to-be-forwarded response message respectively match the type of the response message and the device indication information of the target device that correspond to the request message. In this way, the service instance in the core network may directly perform a message interaction with another device outside the core network by using the core network interface device, so that the complexity of the communication interaction between the core network and each external entity is reduced, and there is no need to implement and maintain the plurality of protocol interfaces in the service instance. The core network interface device supports various message interactions. Therefore, when a network function is newly added, updated, or deleted in a subsequent period, only a service instance corresponding to the network function needs to be adjusted, so that design complexity of the service instance and difficulty of maintenance in a late phase are reduced, and network scalability and flexibility are improved.

DESCRIPTION OF EMBODIMENTS

Figure 1:
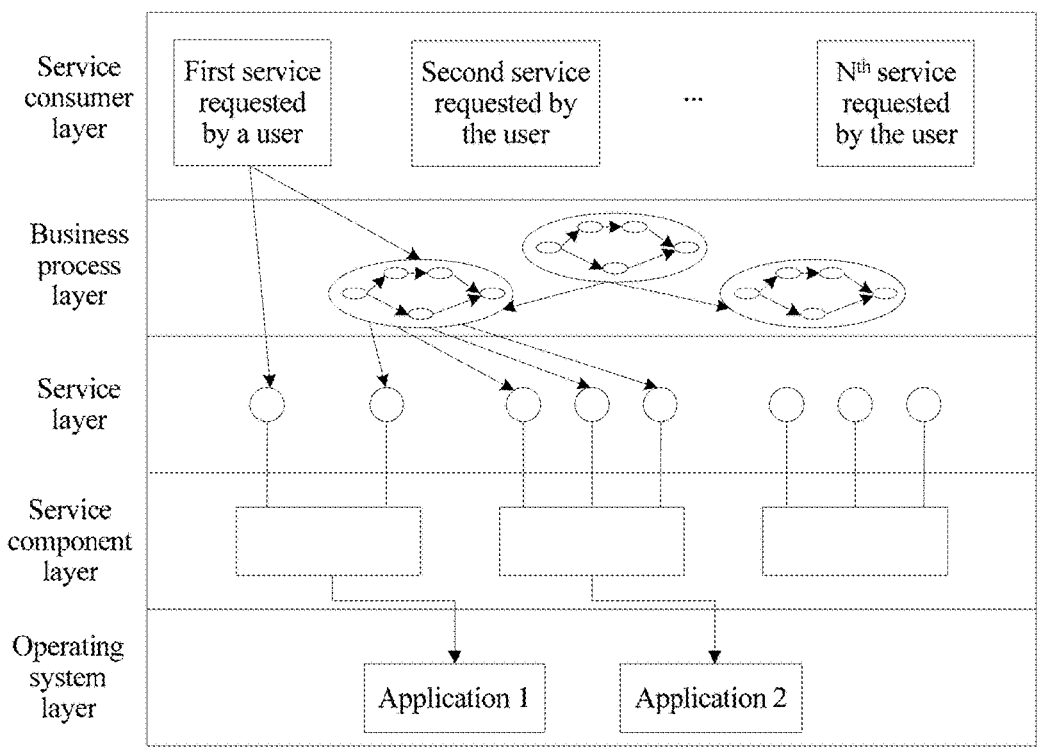
FIG. 1 is a schematic diagram of an SOA-based mobile communications network architecture in the prior art.

To make the objectives, technical solutions, and advantages of the present invention clearer, the following describes the technical solutions of the embodiments of the present invention with reference to the accompanying drawings.

In a mobile communications network with a feature of function isolation or service layering, for example, in a conventional SOA-based mobile communications network, when implementing a network function, a service component in a core network needs to perform a plurality of message interactions by using a plurality of types of protocols. Therefore, the service component in the core network needs to implement and maintain a plurality of protocol interfaces. When a network function is newly added, updated, or deleted in a subsequent period, the service component and the protocol interface need to be redesigned. This results in high design complexity of the service component, increases difficulty of maintenance in a late phase, and reduces network scalability and flexibility.

The embodiments of the present invention provide a message transmission method and an apparatus that is based on the method, such as a core network interface device, so as to reduce complexity of a communication interaction between a core network and each external entity. The method and the apparatus are based on a same inventive concept. Because a problem-resolving principle of the method is similar to that of the apparatus, for similar details, mutually refer to implementation of the apparatus and that of the method. No repeated description is provided.

In the technical solutions of the embodiments of the present invention, the core network interface device is disposed in the core network. After receiving a request message sent by a service instance, the core network interface device obtains device indication information of a target device, an identifier of the service instance, and a type of a response message corresponding to the request message. After sending the request message to the target device, and receiving a to-be-forwarded response message, the core network interface device obtains a type of the to-be-forwarded response message and device indication information of a device that sends the to-be-forwarded response message. The core network interface device obtains the identifier of the service instance, and sends the to-be-forwarded response message to the service instance when the type of the to-be-forwarded response message and the device indication information of the device that sends the to-be-forwarded response message respectively match the type of the response message and the device indication information of the target device that correspond to the request message and are in the message transmission entry. In this way, the service instance in the core network may directly perform a message interaction with another device outside the core network by using the core network interface device, so that the complexity of the communication interaction between the core network and each external entity is reduced, and there is no need to implement and maintain a plurality of protocol interfaces in the service instance. The core network interface device supports various message interactions. Therefore, when a network function is newly added, updated, or deleted in a subsequent period, only a service instance corresponding to the network function needs to be adjusted, so that design complexity of the service instance and difficulty of maintenance in a late phase are reduced, and network scalability and flexibility are improved.

To describe the technical solutions of the embodiments of the present invention more clearly, the following describes, with reference to FIG. 2 to FIG. 5, business scenarios and system architectures that may be applied to the embodiments of the present invention.

Figure 2:
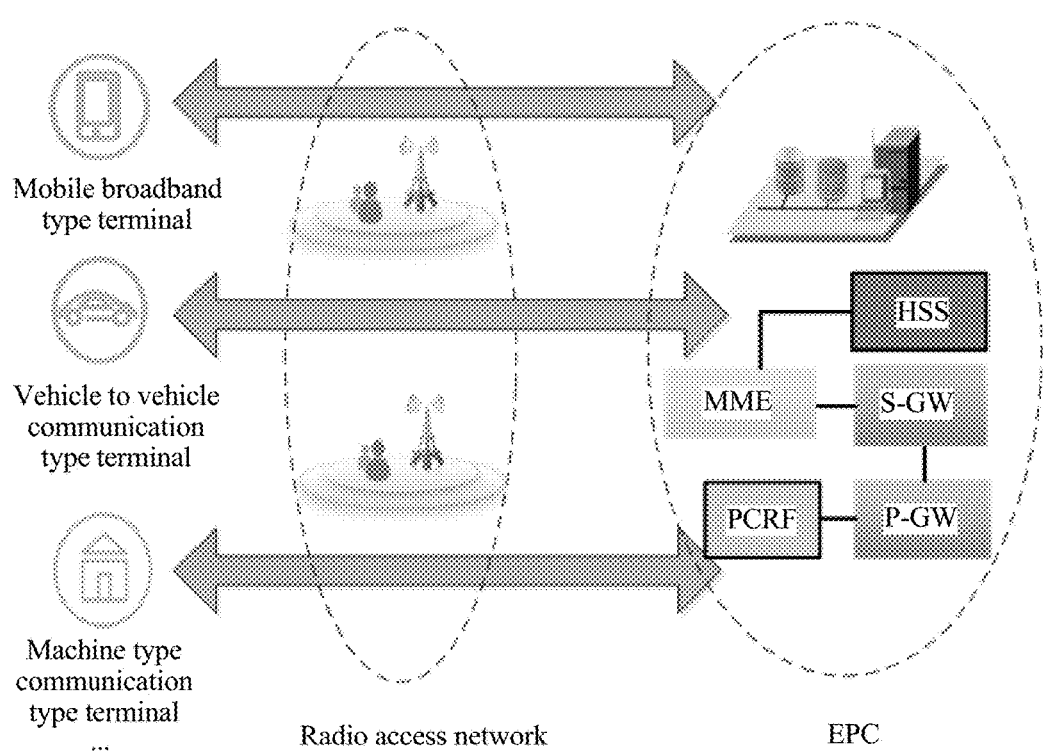
FIG. 2 is a schematic diagram of a possible application scenario according to an embodiment of the present invention.

FIG. 2 shows a possible application scenario according to an embodiment of the present invention. In the application scenario, user equipment (UE) is connected to an EPC network by using a radio access network (RAN), and at least one of the following core network devices in the EPC network provides the UE with a corresponding type of business: an MME, a home subscriber server (HSS), an S-GW, a policy and charging rules function (PCRF) entity, a P-GW, and the like. A control plane of the EPC network provides the UE with control plane services that include UE registration and access, a location update, location switching, bearer establishment, and the like. It should be understood that the EPC network herein may also be referred to as a non-access network. A non-access network is a network that is different from an access network and that provides at least one of the following functions. The functions may include functions such as non-access stratum (NAS) signaling processing, NAS security, authentication, access control, authorization, bearer management, session management, mobility management, location management, lawful interception, and roaming.

Figure 3:
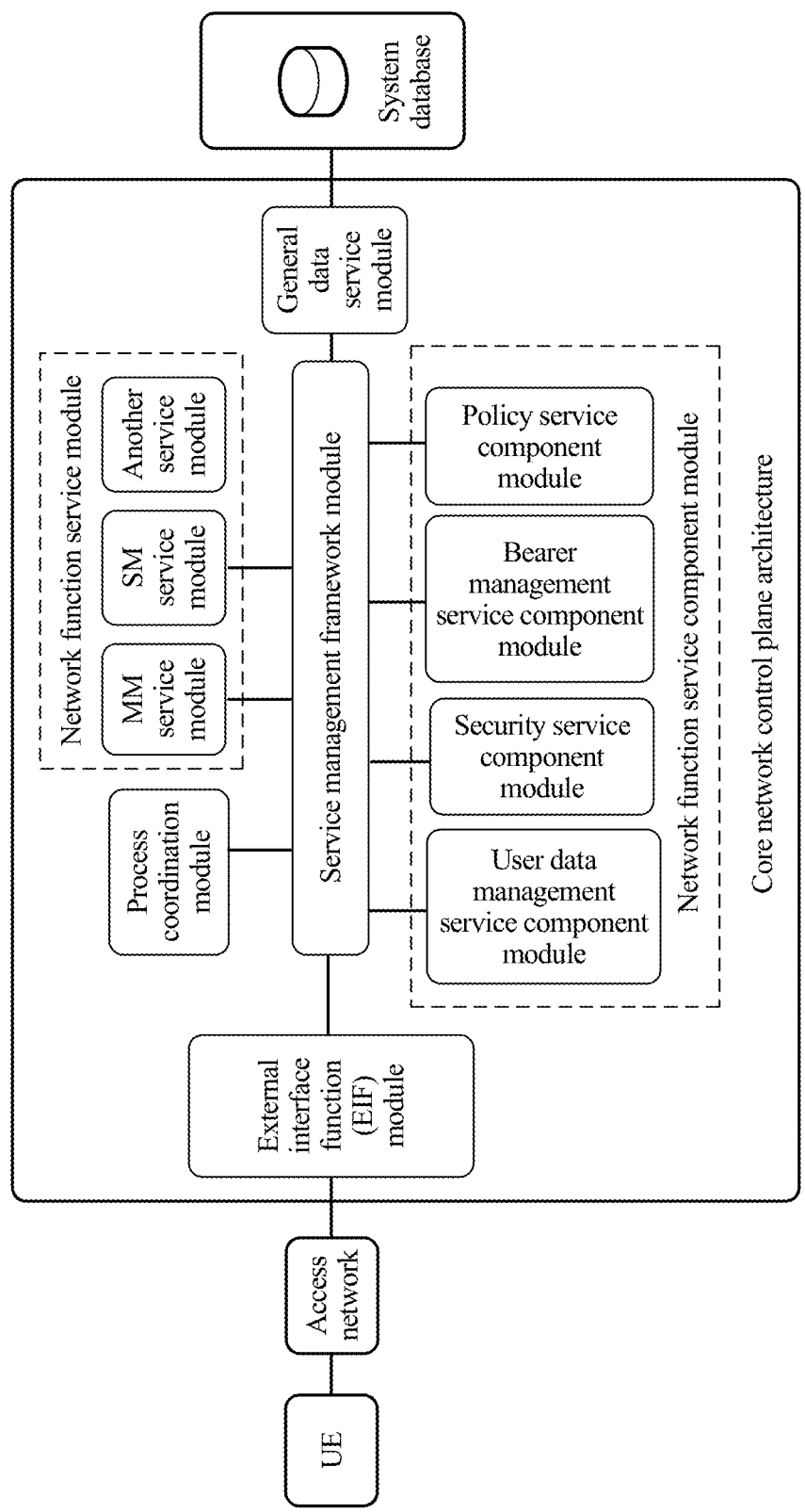
FIG. 3 is a schematic diagram of a possible system architecture according to an embodiment of the present invention.

In the application scenario shown in FIG. 2, an embodiment of the present invention provides a possible system architecture shown in FIG. 3. In the network architecture shown in FIG. 3, a control plane function of a core network is implemented by using "network function+service-oriented architecture". Compared with a conventional core network architecture such as an EPC network architecture, in the network architecture, disposing of conventional network elements such as an MME, an S-GW, and a P-GW included in the EPC network architecture is canceled, and network functions originally distributed on network elements are connected in series, and are merged and reconstructed into a service-oriented core network control plane architecture in which a network function is used as a basic unit. A network function service refers to one or more relatively independent and complete logical function units or modules can process similar types of service requests from UE or another entity in the network, and is responsible for executing a corresponding processing procedure, so as to complete a corresponding network function, for example, a UE registration and access service or a UE location update service.

Specifically, the core network of the network architecture shown in FIG. 3 mainly includes a process coordination module, a plurality of network function service modules, a service management framework module, and a general data service module; and may further include constituent parts such as an external interface function (EIF) module and a plurality of network function service component modules. The following separately describes functions of the constituent parts. It should be understood that names of the constituent parts herein are not unique. For ease of description, the following describes the constituent parts under the foregoing names.

The process coordination module is a unified service coordination module of an entire service-oriented control plane architecture. The process coordination module is responsible for determining a corresponding network function based on signaling from UE or another network element, and invoking a corresponding network function service module by using a service management framework, to complete a service request selection process. In the process, the process coordination module may be further responsible for completing service request conflict detection and processing, for example, when a new service request conflicts with a current service procedure, determining to preferentially execute, suspend, or reject the service request.

The network function service module is a basic constituent unit of network functions implemented by the entire service-oriented control plane architecture, and may also be referred to as a network function service unit. The network function service module is a relatively independent and complete logical function entity. The network function service module can complete a corresponding network function based on a service request for a type of business. As shown in FIG. 3, a mobility management (MM) service module may complete a network function of mobility management on all types of businesses (such as an MBB business, a V2V business, and an MTC business in FIG. 2). A security management (SM) service module may complete a network function of security management on an MBB business, a V2V business, and an MTC business. For example, the network function service module may complete a UE registration and access service, a UE location update service, a UE handover service, and the like. The network function service module may invoke one or more network function service component modules that are combined in a business execution order, to implement a corresponding network function.

The network function service component module is a general network function unit that is abstracted from and independent of the entire service-oriented control plane architecture, and may also be referred to as a network function service component unit. Usually, the network function service component module may be invoked by one or more network function service modules to complete a specific general network function required in network functions implemented by the network function service modules. For example, a security verification service and a bearer establishment service may be completed by the network function service component module, and may be invoked for a UE registration and access service, a UE handover service, and the like. In addition, the network function service component module may be built into the network function service module.

The general data service module is configured to store a user context, a security context, a bearer context, a network policy, and the like into a system database (a subscription data center module).

The external interface function module is a unified external interface of the entire service-oriented control plane architecture. The external interface function module processes a message interaction with another network element outside the core network. The external interface function module is responsible for implementing an interface function between a function module (including the process coordination module, the network function service module, the network function service component module, and the like) in the control plane architecture and an external entity. The interface function includes communications channel establishment, connection context maintenance, message protocol encapsulation and decapsulation, message forwarding and receiving, and the like. Certainly, in this embodiment, one or more of the process coordination module, the network function service component module, the general data service module, and the network function service module may directly implement the interface function of the external interface function module.

The service management framework module is a unit that executes a service management function in the entire service-oriented control plane architecture. A network function unit in the network, such as the network function service module and the network function service component module, may be flexibly configured into the service-oriented control plane architecture by using service registration, for being discovered and invoked by another entity in the network by using the service management framework.

It should be noted that, different from distributed and replicated storage on user data by a conventional network element, the service-oriented control plane architecture decouples business processing logic of a network function from user data that needs to be processed; places, into a unified system database for storage, a user context, a security context, a bearer context, a network policy, and the like stored in the conventional network element; and provides access to the database by using a generalized data service.

Figure 4:
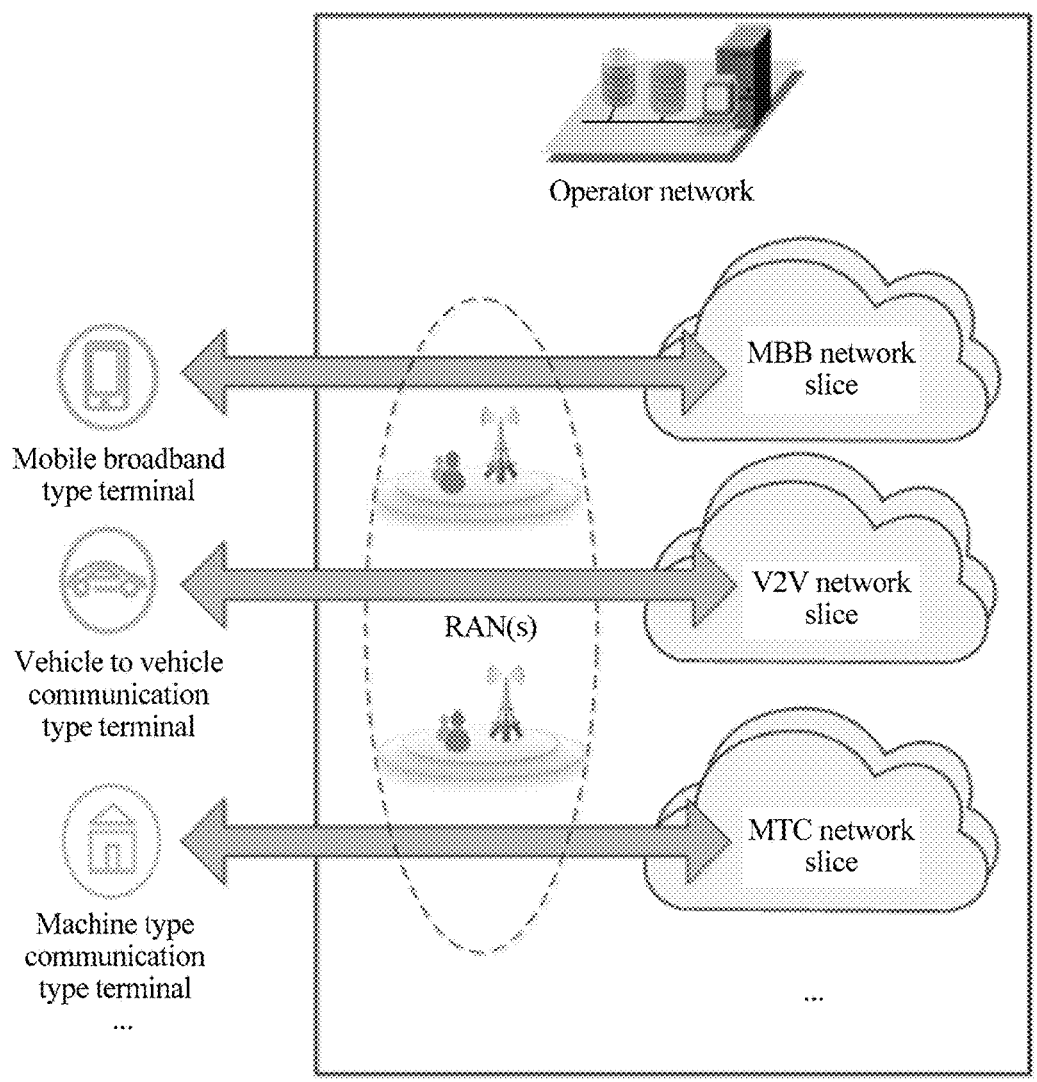
FIG. 4 is a schematic diagram of another possible application scenario according to an embodiment of the present invention.

FIG. 4 shows another possible application scenario according to an embodiment of the present invention. To provide a user with a more perfect network function, in a 5G mobile communications network, the network may further abstract a logical function as a network slice. As shown in FIG. 4, each type of business corresponds to one network slice in a core network, and each network slice provides UE with a control plane service of a corresponding business. In the application scenario shown in FIG. 4, a mobile broadband type terminal accesses an MBB network slice by using a RAN, a vehicle to vehicle communication type terminal accesses a V2V network slice by using the RAN, and a machine type communication type terminal accesses an MTC network slice by using the RAN. A core network device in each network slice provides accessed UE with a control plane service of a corresponding type of business, for example, UE registration and access, a location update, location switching, and bearer establishment.

Figure 5:
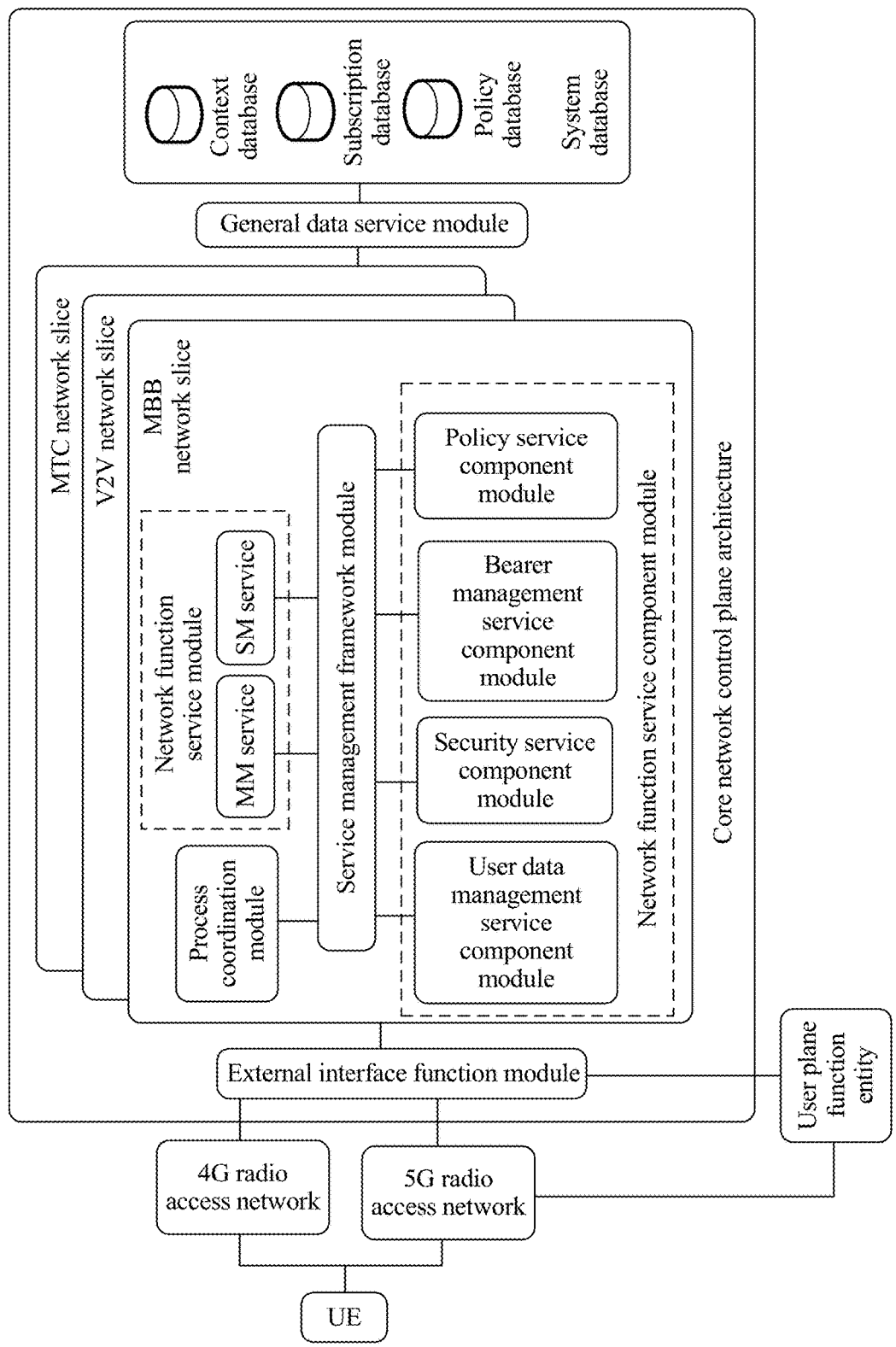
FIG. 5 is a schematic diagram of another possible system architecture according to an embodiment of the present invention.

In the application scenario shown in FIG. 4, an embodiment of the present invention provides another possible system architecture shown in FIG. 5. Similar to the network architecture shown in FIG. 3, the network architecture shown in FIG. 5 merges control plane functions of an MME, an S-GW, a P-GW, and a PCRF in a conventional EPC network architecture. In the network architecture, disposing of a conventional network element in the EPS architecture is canceled, and a control plane function of a core network is implemented by using "network function+service-oriented architecture". The network architecture connects in series network functions originally distributed on network elements to constitute a complete network function unit in which a network function service module is used as a unit, for example, a mobility management unit, a security processing unit, an attach unit, and a tracking area update (TAU) unit. In a business processing process, business logic is defined and executed by a network function service module, and a business operation is implemented by the network function service module by invoking a network function service component module. A set of network function service modules configured to process and implement a specific network function together constitute a service set, and one service set corresponds to one network slice. To provide various types of network functions, a plurality of network slices may be deployed in a communications network. For example, in the scenario shown in FIG. 4, an MBB network slice, a V2V network slice, an MTC network slice, and the like need to be deployed. The network architecture decouples business logic from user data; places, into a unified system database for storage, a UE context, a security context, a bearer context, a network policy, and the like stored in a conventional network element; and provides access to the database by using a general data service module.

In the network architecture shown in FIG. 5, an architecture in each network slice is similar to the overall core network control plane architecture in FIG. 3. Corresponding modules in the two architectures have same or similar functions, for example, network function service modules, process coordination modules, service management framework modules, network function service component modules, and general data service modules. For details, refer to the detailed description in the foregoing description of FIG. 3, and details are not described herein. The following further describes the network architecture shown in FIG. 5.

A network function service module in each network slice provides a control plane service of a corresponding type of business. For example, a network function service module such as an MM service module or an SM service module in an MBB network slice provides a control plane service of an MBB business, and a network function service module such as an MM service module or an SM service module in a V2V network slice provides a control plane service of a V2V business.

In the network architecture, an external interface function module and each network slice, and each network slice and the general data service module are connected by using a system bus. The system bus has a service registration function and a service discovery function, and implements a data interaction between the network function service module and each of system databases.

The external interface function module is a unified external interface of an entire core network control plane. The external interface function module is responsible for a message interaction between a RAN side and a user plane function entity in a communications system such as a 4th Generation (4G)/5th Generation (5G) system, and is directly connected to the system bus.

The process coordination module is responsible for distributing a service request from UE and that from a network and for service conflict detection and processing. Specifically, the process coordination module receives a service request from the UE or another network entity (such as an HSS) by using the external interface function module, completes service conflict detection and processing (for example, preferential execution, suspension, or rejection of a new service request), and then distributes the service request to a corresponding network function service module.

In FIG. 5, the external interface function module is located outside the network slice, and the process coordination module is located in the network slice. In actual implementation, alternatively, both the external interface function module and the process coordination module may be located in the network slice or outside the network slice. Alternatively, the external interface function module may be located in the network slice, and the process coordination module may be located outside the network slice. In other words, there may be a plurality of choices when the external interface function module and the process coordination module are deployed in the network. The process coordination module may be in a network slice, or may be a process coordination module shared by the entire network. An MBB network slice, a V2V network slice, and an MTC network slice are used as an example. The three network slices may share one external interface function module or one process coordination module. Alternatively, one external interface function module or one process coordination module is deployed in each network slice. Alternatively, some of the network slices share one external interface function module or one process coordination module, and one external interface function module or one process coordination module is deployed in each of the rest of the network slices. FIG. 5 merely shows a possible case and does not constitute a limitation on the embodiments of the present invention.

It should be noted that, in the embodiments of the present invention, nouns "network" and "system" are usually interchangeably used, but meanings of the nouns may be understood by a person skilled in the art. The UE in the embodiments of the present invention may include various handheld devices having a radio communication function, an in-vehicle device, a wearable device, a computing device, another processing device connected to a wireless modem, or user equipment in various forms, including a mobile station (MS), a terminal, a terminal device, and the like. For ease of description, in the embodiments of the present invention, the devices mentioned above are collectively referred to as user equipment or UE. The mobile broadband (MBB) type terminal, the machine type communication (MTC) type terminal, the vehicle to vehicle communication type terminal (which may also be referred to as a vehicle to vehicle (V2V) communication type terminal) shown in FIG. 2 and FIG. 4 and a terminal shown in FIG. 5 that may support a 4G or 5G network are merely used as examples and do not constitute a limitation on the embodiments of the present invention. The UE may also be another UE that obtains a service in the communications system. For example, the UE may normally apply to the core network control plane architecture for a service by using message content and a procedure that are defined in the conventional EPC network.

It may be understood that the network architecture and the application scenario described in the embodiments of the present invention are intended to describe the technical solutions in the embodiments of the present invention more clearly, but do not constitute a limitation on the technical solutions provided in the embodiments of the present invention. A person of ordinary skill in the art may be aware that, with evolution of the network architecture and emergence of a new business, the technical solutions provided in the embodiments of the present invention are also applicable to a similar technical problem.

The following further describes the embodiments of the present invention in detail based on the foregoing common aspects included in the embodiments of the present invention.

Figure 6:
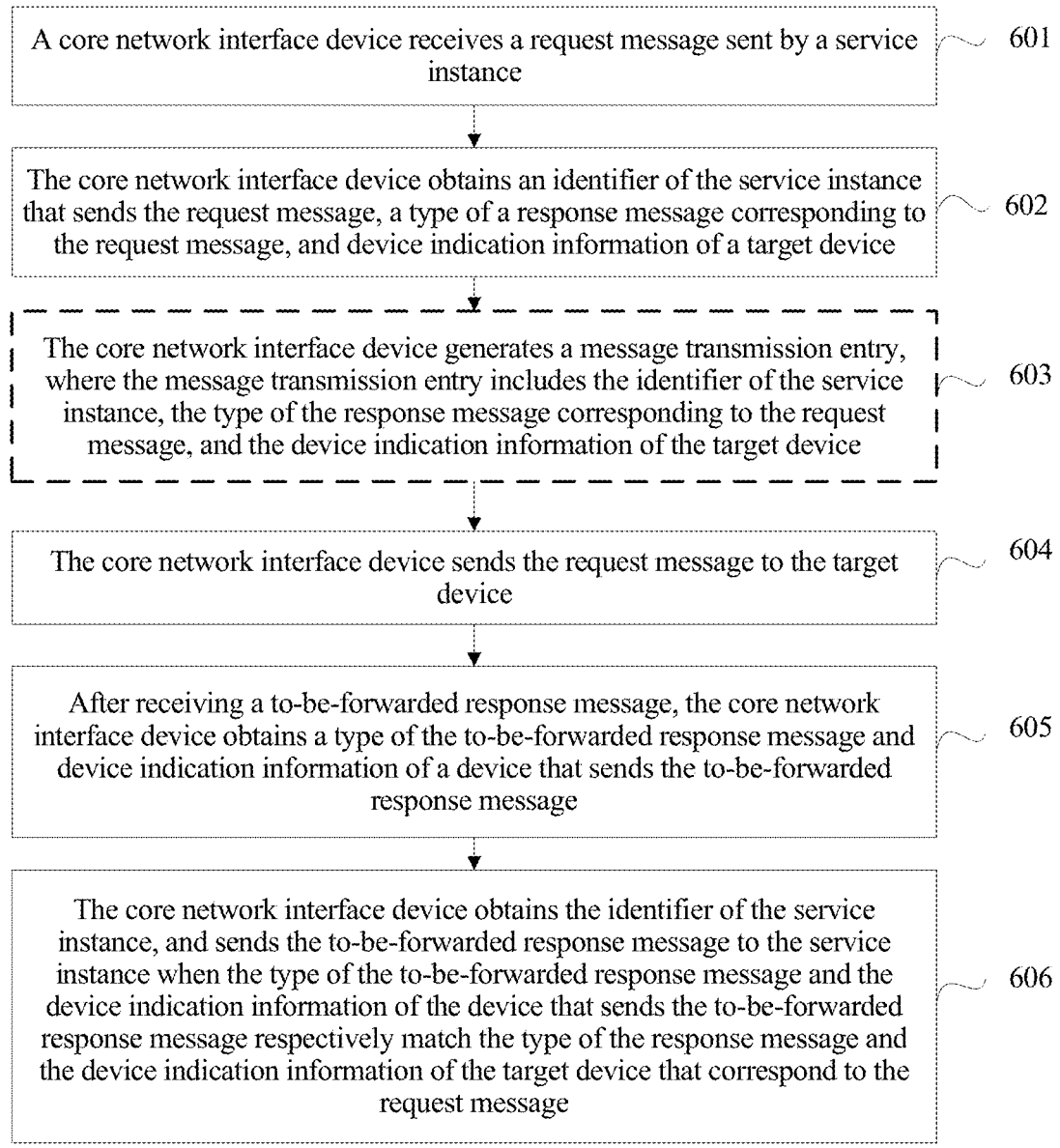
FIG. 6 is a schematic flowchart of a message transmission method according to an embodiment of the present invention.

FIG. 6 is a schematic flowchart of a message transmission method according to an embodiment of the present invention. Referring to FIG. 6, a specific procedure of the method includes the following steps.

step 601: A core network interface device receives a request message sent by a service instance.

The service instance is software and hardware resources in a core network that are for implementing a network function or a subtask in the network function.

In an example, the service instance may be a network function service module configured to implement a network function in the core network control plane architecture shown in FIG. 3 or FIG. 5, or may be a network function service component module invoked by the network function service module. The network function service component module is configured to implement a subtask in a network function.

In another example, when the service instance needs to perform a message interaction with a device (such as UE or a user plane function entity) outside the core network to implement a network function, the service instance may construct a request message based on a specification of a conventional evolved packet system (EPS) procedure, and send the request message to the core network interface device. For example, when processing a business, a service instance for an attach procedure needs to construct an authentication request message, and send the authentication request message to the UE.

Step 602: The core network interface device obtains an identifier of the service instance that sends the request message, and a type of a response message and device indication information of a target device that correspond to the request message.

The target device is a device that receives and responds to the request message.

In an example, the core network interface device obtains the identifier of the service instance in the following several manners:

Manner 1: When processing a business, the service instance sends the request message and the identifier of the service instance to the core network interface device. The core network interface device receives the identifier of the service instance that is sent by the service instance that sends the request message.

Manner 2: The request message generated by the service instance includes the identifier of the service instance. After receiving the request message, the core network interface device obtains the identifier of the service instance that is included in the request message.

Manner 3: When an Internet Protocol (IP) address is allocated to each service instance in the core network, the request message sent by the service instance includes an IP address of the service instance (that is, a source IP address). After receiving the request message, the core network interface device obtains the source IP address in the request message, and obtains, based on a plurality of stored correspondences between an IP address and a service instance, the service instance corresponding to the source IP address, so as to determine the identifier of the obtained service instance.

In the foregoing several manners, the core network interface device may accurately and quickly obtain the identifier of the service instance, and then may generate a message transmission entry by using the identifier of the service instance, so that after subsequently receiving a response message from the target device, the core network interface device can accurately send the response message to the service instance based on the message transmission entry.

In another example, the core network interface device obtains, in the following several manners, the type of the response message corresponding to the request message:

Manner 1: The service instance pre-stores a plurality of correspondences between a type of a request message and a type of a response message; determines a type of the request message after processing a business and generating the request message; obtains, based on the correspondences between a type of a request message and a type of a response message that are stored in the service instance, the type of the response message corresponding to the request message; and sends the request message and the type of the response message corresponding to the request message to the core network interface device. The core network interface device receives the type that is of the response message corresponding to the request message and that is sent by the service instance. In this manner, the type of the request message and the type of the response message corresponding to the request message may be maintained in the service instance.

Manner 2: The core network interface device pre-stores a plurality of correspondences between a type of a request message and a type of a response message. After receiving the request message, the core network interface device obtains a type of the request message, and determines, based on a preset correspondence between a type of a request message and a type of a response message, the type of the response message corresponding to the request message. In this manner, the type of the request message and the type of the response message corresponding to the request message may be maintained in the core network interface device.

In the foregoing several manners, the core network interface device may accurately and quickly obtain the type of the response message corresponding to the request message, and then may generate a message transmission entry by using the type of the response message, so that after subsequently receiving a response message from the target device, the core network interface device can match a type of the response message with the message transmission entry, and accurately send the response message to the service instance when the matching succeeds. In manner 2, the core network interface device may obtain the type of the request message in different implementations. For example, the core network interface device may determine the type of the request message based on content of the request message. For another example, the core network interface device may directly receive the type that is of the request message and that is sent by the service instance. For another example, when a message type field in a message header of the request message sent by the service instance is not null, the core network interface device may read the message type field in the request message, and determine the type of the request message based on content of the message type field.

In another example, the type of the response message corresponding to the request message in this embodiment of the present invention includes at least one of a type of a normal response message and a type of an error indication response message. The normal response message is a message that is returned by a communications peer end based on a standard and that enables execution of a procedure to continue normally. The error indication response message is generally an error cause message sent when a procedure is terminated due to an unpredictable error that occurs in a communications peer end.

It should be noted that the device indication information of the target device may be any information that can uniquely identify the target device. For example, the device indication information may be an identifier of the target device or an identifier of a channel between the core network interface device and the target device. The identifier of the target device may be information such as an IP address of the target device, an international mobile subscriber identity (IMSI) of the target device, a temporary identity (Temporary Mobile Subscriber Identity, TMSI) of the target device, a globally unique temporary UE identity (GUTI) of the target device, or a domain name of the target device.

In a first case, the device indication information of the target device may be the identifier of the target device, and the core network interface device obtains the device indication information of the target device in the following two manners:

Manner 1: When processing a business, the service instance sends the request message and the identifier of the target device to the core network interface device. The request message and the identifier of the target device may be sent together to the core network interface device, or may be separately sent to the core network interface device. The core network interface device receives the identifier of the target device that is sent by the service instance.

Manner 2: The request message generated by the service instance includes the identifier of the target device. After receiving the request message, the core network interface device obtains the identifier of the target device that is included in the request message.

In a second case, the device indication information of the target device may be the identifier of the channel between the core network interface device and the target device, and that the core network interface device obtains device indication information of the target device includes: The core network interface device obtains the identifier of the target device that corresponds to the request message. For example, the core network interface device receives the identifier of the target device that is sent by the service instance that sends the request message. Alternatively, the core network interface device obtains the identifier of the target device that is included in the request message. The core network interface device retrieves, from a preset correspondence between a device identifier and a channel identifier, a channel identifier corresponding to the identifier of the target device, for example, retrieves a first correspondence that includes the identifier of the target device. When the channel identifier corresponding to the identifier of the target device is retrieved, the core network interface device uses the channel identifier as the identifier of the channel between the core network interface device and the target device. For example, when the first correspondence is retrieved, the core network interface device uses, as the identifier of the channel between the core network interface device and the target device, a channel identifier included in the first correspondence. Alternatively, when the channel identifier corresponding to the identifier of the target device is not retrieved, for example, when the first correspondence is not retrieved, the core network interface device establishes the channel between the core network interface device and the target device, and obtains the identifier of the channel between the core network interface device and the target device.

In the second case, after establishing the channel between the core network interface device and the target device, the core network interface device may further establish a correspondence between the identifier of the channel and the identifier of the target device, and store the established correspondence into the preset correspondence between a device identifier and a channel identifier, so that when the service instance in the core network subsequently sends the request message to the target device, the core network interface device can directly determine the identifier of the channel by using the preset correspondence between a device identifier and a channel identifier.

In the two manners, the core network interface device may accurately and quickly obtain the device indication information of the target device, and then may generate a message transmission entry by using the device indication information of the target device, so that when subsequently receiving a response message, the core network interface device can match the device indication information of the target device in the message transmission entry with device indication information of a device that sends the response message; and when the matching succeeds, determine that the device that sends the response message is the target device for the request message. Therefore, the core network interface device may send the response message to the service instance.

Step 603: The core network interface device generates a message transmission entry, where the message transmission entry includes the identifier of the service instance, and the type of the response message and the device indication information of the target device that correspond to the request message.

The message transmission entry is merely used as an example. Alternatively, the core network interface device may store, in another form, the identifier of the service instance, and the type of the response message and the device indication information of the target device that correspond to the request message.

The message transmission entry includes the identifier of the service instance, and the type of the response message and the device indication information of the target device that correspond to the request message. In this way, after receiving a response message, the core network interface device may obtain a type of the response message and device indication information of a device that sends the response message, and respectively match the type of the response message and the device indication information of the device that sends the response message with the type of the response message and the device indication information of the target device that correspond to the request message and are in the message transmission entry. When the matching succeeds, it indicates that the response message is returned for the request message and needs to be sent to the service instance. When the type of the response message corresponding to the request message in the message transmission entry includes two types: a type of a normal response message and a type of an error indication response message, if the type of the response message is the same as any type in the message transmission entry, it indicates that the matching succeeds.

In an example, when forwarding a plurality of request messages, the core network interface device generates a corresponding message transmission entry for each request message. After receiving a response message, the core network interface device may obtain, from the response message, a type of the response message and device indication information of a device that sends the response message; match the type and the device indication information with information in each of a plurality of message transmission entries; and when determining that the type and the device indication information successfully match information in a first message transmission entry, send the response message to a service instance corresponding to a service instance identifier in the first message transmission entry. In this way, the response message may be accurately transmitted to the service instance, so that message transmission efficiency is improved.

It should be noted that, step 603 is an optional part, and step 603 may or may not be performed in a solution of this embodiment of the present invention.

Step 604: The core network interface device sends the request message to the target device.

There is no sequence between step 604 and step 603. The core network interface device may perform step 604 before step 603, may perform step 603 before step 604, or may simultaneously perform step 604 and step 603. This is not limited in the present invention.

In an example, that the core network interface device sends the request message to the target device includes: The core network interface device determines the target device based on the device indication information of the target device, and selects a corresponding first communications protocol based on a type of the target device. The core network interface device performs protocol encapsulation on the request message based on the first communications protocol, and sends, to the target device, the request message on which protocol encapsulation is performed. In the core network interface device, a plurality of types of communications protocols may be set, and a table of a correspondence between a device type and a communications protocol may be configured, so as to perform message interactions with various types of devices (such as UE, a base station, and an HSS) outside the core network. For example, if the core network interface device determines, based on the device indication information, that the target device is an evolved NodeB (eNB), the core network interface device may select a communications protocol: the S1 protocol, and then use the S1 protocol to encapsulate the request message. For another example, if the core network interface device determines that the target device is UE, the core network interface device selects the NAS protocol to encapsulate the request message. For another example, if the core network interface device determines that the target device is an HSS, the core network interface device selects the Sha protocol to encapsulate the request message.

The plurality of types of communications protocols may be implemented in the core network interface device. To be specific, a plurality of protocol interfaces are implemented and maintained. Therefore, the service instance in the core network does not need to implement and maintain a plurality of protocol interfaces, and may only send the request message to the core network interface device. The core network interface device may encapsulate the request message by using a proper communications protocol, and send an encapsulated request message to the target device. The service instance in the core network does not need to implement and maintain the plurality of protocol interfaces. Therefore, when a network function in the core network is newly added, updated, or deleted, a corresponding service instance may be directly added, updated, or deleted, and a communications protocol corresponding to the network function may be newly added, updated, or deleted in the core network interface device. In this way, design complexity of the service instance is reduced, difficulty of maintenance in a late phase is reduced, and core network scalability and flexibility are enhanced.

Step 605: After receiving a to-be-forwarded response message, the core network interface device obtains a type of the to-be-forwarded response message and device indication information of a device that sends the to-be-forwarded response message.

In an example, that the core network interface device obtains device indication information of a device that sends the to-be-forwarded response message includes: The core network interface device determines a channel for transmitting the to-be-forwarded response message, and determines, based on the channel and a preset correspondence between device indication information and a channel, the device indication information of the device that sends the to-be-forwarded response message.

In another example, that the core network interface device obtains a type of the to-be-forwarded response message based on the to-be-forwarded response message includes: The core network interface device determines, based on the obtained device indication information of the device that sends the to-be-forwarded response message, the device that sends the to-be-forwarded response message; and selects a corresponding second communications protocol based on a type of the device that sends the to-be-forwarded response message. The core network interface device decapsulates the to-be-forwarded response message based on the second communications protocol. The core network interface device obtains the type of the to-be-forwarded response message based on the decapsulated to-be-forwarded response message. A process of selecting a communications protocol in a process of decapsulating the to-be-forwarded response message by the core network interface device is similar to a process of selecting a communications protocol in a process of encapsulating the request message. Details are not described herein. Usually, the first communications protocol for encapsulating the request message and the second communications protocol for decapsulation are a same communications protocol.

Step 606: The core network interface device obtains the identifier of the service instance, and sends the to-be-forwarded response message to the service instance when the type of the to-be-forwarded response message and the device indication information of the device that sends the to-be-forwarded response message respectively match the type of the response message and the device indication information of the target device that correspond to the request message.

When step 603 is performed in the solution in this embodiment of the present invention, step 606 may be as follows: The core network interface device obtains the identifier of the service instance in the message transmission entry, and sends the to-be-forwarded response message to the service instance when the type of the to-be-forwarded response message and the device indication information of the device that sends the to-be-forwarded response message respectively match the type of the response message and the device indication information of the target device that correspond to the request message and are in the message transmission entry.

When the type of the response message corresponding to the request message in the message transmission entry includes two types: a type of a normal response message and a type of an error indication response message, if the type of the to-be-forwarded response message is the same as any type in the message transmission entry, it indicates that the matching succeeds.

According to the description in step 603, it can be learned that, after a response message is received, a type of the response message and device indication information of a device that sends the response message may be obtained, and the type of the response message and the device indication information of the device that sends the response message are respectively matched with the type of the response message and the device indication information of the target device that correspond to the request message and are in the message transmission entry. When the matching succeeds, it indicates that the response message is returned for the request message and needs to be sent to the service instance corresponding to the service instance identifier in the message transmission entry. Therefore, the core network interface device sends the response message to the service instance.

In an example, that the core network interface device sends the to-be-forwarded response message to the service instance includes: The core network interface device sends the decapsulated to-be-forwarded response message to the service instance.

In another example, the core network interface device may further delete the message transmission entry after sending the to-be-forwarded response message to the service instance. It can be learned from the foregoing description that each message transmission entry is generated for one request message. Therefore, after a response message corresponding to the request message is forwarded, the message transmission entry is invalidated. After the message transmission entry is deleted, it can be ensured that each message transmission entry stored in the core network interface device is generated for one request message, and may be used to forward a unique response message corresponding to a request message. Therefore, subsequent incorrect transmission of another response message can be avoided, to ensure an accuracy rate of subsequent response message forwarding.

By using the message transmission method provided in this embodiment of the present invention, the core network interface device is disposed in the core network. After receiving the request message sent by the service instance, the core network interface device obtains the device indication information of the target device, the identifier of the service instance, and the type of the response message corresponding to the request message. The target device is a device that receives and responds to the request message. After sending the request message to the target device, and receiving the to-be-forwarded response message, the core network interface device obtains the type of the to-be-forwarded response message and the device indication information of the device that sends the to-be-forwarded response message. The core network interface device obtains the identifier of the service instance, and sends the to-be-forwarded response message to the service instance when the type of the to-be-forwarded response message and the device indication information of the device that sends the to-be-forwarded response message respectively match the type of the response message and the device indication information of the target device that correspond to the request message. In this way, the service instance in the core network may directly perform a message interaction with another device outside the core network by using the core network interface device, so that complexity of a communication interaction between the core network and each external entity is reduced, and there is no need to implement and maintain the plurality of protocol interfaces in the service instance. The core network interface device supports various message interactions. Therefore, when a network function is newly added, updated, or deleted in a subsequent period, only a service instance corresponding to the network function needs to be adjusted, so that design complexity of the service instance and difficulty of maintenance in a late phase are reduced, and network scalability and flexibility are improved.

Figure 7:
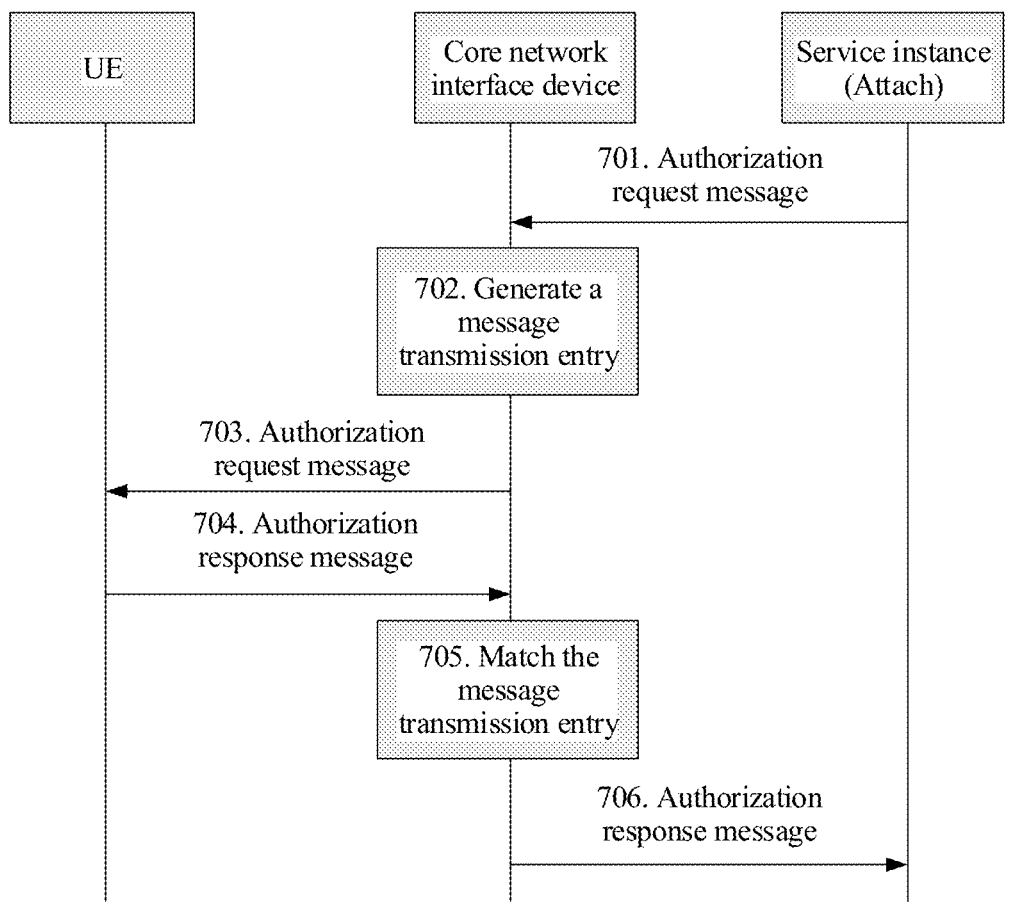
FIG. 7 is a schematic diagram of communication in another message transmission method according to an embodiment of the present invention.

Based on the method shown in FIG. 6, as shown in FIG. 7, an embodiment of the present invention provides a message transmission method in an authentication key agreement (AKA) process during implementation of a network function attach. In the AKA process, a core network service instance Attach needs to perform a message interaction with UE, to perform two-way authentication and generate a key.

Step 701: A service instance Attach in a core network control plane architecture sends an authentication request message to a core network interface device. A target device for the authentication request message is UE.

Step 702: After receiving the authentication request message, the core network interface device generates and stores a message transmission entry.

The core network interface device may obtain device indication information of the target device (UE), an identifier (attach ID) of the service instance, and a type (authentication response type) of an authorization response message corresponding to the authentication request message. The device indication information of the target device (UE) is any information that uniquely identifies the target device (UE), and may be an identifier (such as a UE ID) of the target device or an identifier (such as a channel ID) of a channel between the core network interface device and the UE. The UE ID may be any one of an IP address of the UE, an IMSI of the UE, a TMIS of the UE, a GUTI of the UE, a domain name of the UE, and the like.

For a manner in which the core network interface device separately obtains the device indication information of the target device, the identifier (such as the attach ID) of the service instance, and the type (authentication response type) of the authorization response message corresponding to the authentication request message, refer to step 602 in the foregoing embodiment. Details are not described herein.

When the device indication information is a channel ID, the core network interface device obtains a UE ID, and tries to retrieve, based on the UE ID and from a stored correspondence between a device identifier and a channel identifier, a channel ID that is of an S1 channel on a RAN side and that corresponds to the UE ID. If the channel ID is retrieved, the core network interface device may directly determine the channel ID corresponding to the UE ID. If the channel ID is not retrieved, the core network interface device invokes a paging (paging) service in the network to page the UE, and a corresponding service request service instance in the core network sends a service request (service request) to complete a service request procedure of the UE, so as to establish the S1 channel and finally determine the channel ID of the established S1 channel.

Step 703: The core network interface device sends the authentication request message to UE.

Specifically, the core network interface device selects a corresponding communications protocol (that is, the S1 protocol) based on a type of the target device (that is, the UE), uses the S1 protocol to encapsulate the authentication request message into a NAS message, and sends the NAS message to the UE by using the channel between the UE and the core network interface device.

When there is no channel between the UE and the core network interface device, the core network interface device invokes the paging service in the network to page the UE, and the corresponding service request service instance in the core network sends the service request to complete the service request procedure of the UE, so as to establish the S1 channel.

Step 704: After receiving the encapsulated authentication request message (a NAS message), the UE returns an authorization response message (a NAS message) to the core network interface device.

Step 705: After receiving an authorization response message (a NAS message), the core network interface device obtains a type of the authorization response message and device indication information of a device (UE) that sends the authorization response message, and matches the two obtained messages with at least one stored message transmission entry.

The core network interface device determines the device indication information of the device that sends the authorization response message, so that the core network interface device selects a corresponding communications protocol (the S1 protocol) based on a type of the device (UE) that sends the authorization response message, and uses the S1 protocol to decapsulate the authorization response message, so as to determine, through reading, that a message type in a message header of the authorization response message is an authentication response type.

The core network interface device matches the obtained type (the authentication response type) of the authorization response message and the obtained device indication information of the device that sends the authorization response message with a type of a response message corresponding to a request message and device indication information of a target device in each of the at least one stored message transmission entry.

Step 706: The core network interface device sends the authorization response message to the service instance Attach when determining that the two messages successfully match the message transmission entry generated in step 702.

In an example, the core network interface device sends a decapsulated authorization response message to the service instance Attach when determining that the two messages successfully match the message transmission entry generated in step 702.

The core network interface device deletes the successfully matched message transmission entry immediately after sending the authorization response message, so as to avoid subsequent incorrect transmission of another response message.

It may be understood that the message transmission method provided in this embodiment of the present invention is applicable to the application scenario shown in FIG. 2 or FIG. 4. The external interface function module in the core network control plane architecture shown in FIG. 3 or FIG. 5 may complete functions executed by the core network interface device in the method shown in FIG. 6 or FIG. 7.

The foregoing describes the solutions provided in the embodiments of the present invention mainly from a perspective of an interaction between network elements. It may be understood that, to implement the foregoing functions, each network element such as UE or a core network interface device includes a corresponding hardware structure and/or software module for executing each function. A person skilled in the art may be readily aware that, in combination with the example modules and algorithm steps described in the embodiments disclosed in this specification, the present invention can be implemented in a form of hardware, or a combination of hardware and computer software. Whether a function is executed by hardware or is executed in a manner in which computer software drives hardware depends on particular applications and design constraint conditions of the technical solutions. A person skilled in the art may use different methods to implement the described functions for each particular application, but it should not be considered that the implementation goes beyond the scope of the present invention.

Figure 8:
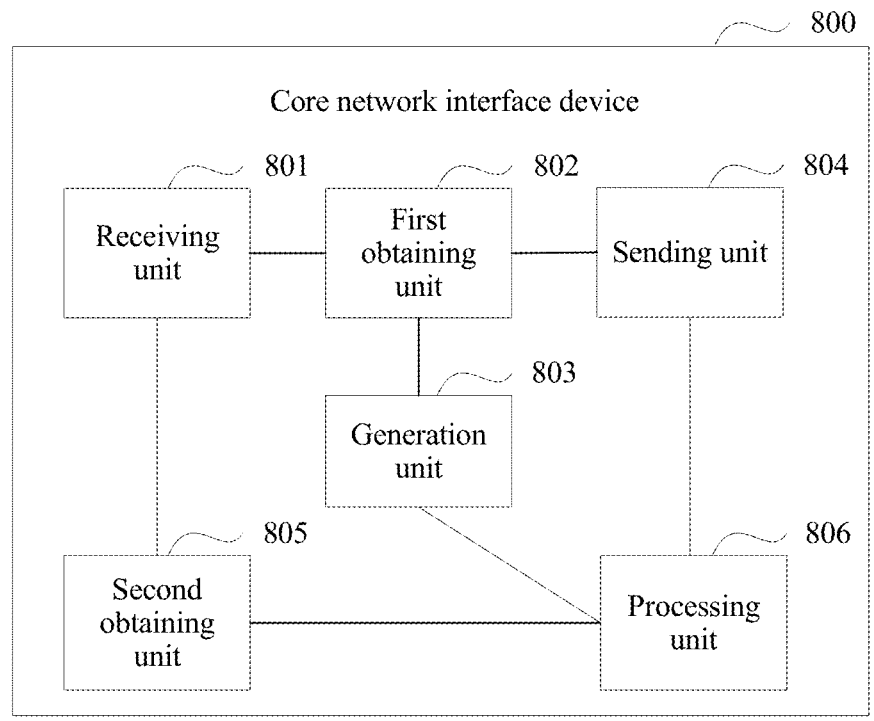
FIG. 8 is a schematic structural diagram of a core network interface device according to an embodiment of the present invention.

FIG. 8 is a possible schematic structural diagram of a core network interface device in the foregoing embodiments. The core network interface device may implement the function of the external interface function module in the core network control plane architecture shown in FIG. 3 or FIG. 5.

Referring to FIG. 8, a core network interface device 800 includes a receiving unit 801, a first obtaining unit 802, a generation unit 803, a sending unit 804, a second obtaining unit 805, and a processing unit 806. The units may execute corresponding functions in the foregoing method examples. For example, the receiving unit 801 is configured to receive a request message sent by a service instance. The first obtaining unit 802 is configured to obtain an identifier of the service instance that sends the request message, and a type of a response message and device indication information of a target device that correspond to the request message. The sending unit 804 is configured to send the request message to the target device. The receiving unit 801 is further configured to receive a to-be-forwarded response message. The second obtaining unit 805 is configured to: after the receiving unit 801 receives the to-be-forwarded response message, obtain device indication information of a source device that sends the to-be-forwarded response message, and obtain a type of the to-be-forwarded response message based on the to-be-forwarded response message. The processing unit 806 is configured to obtain the identifier of the service instance when the type of the to-be-forwarded response message and the device indication information of the source device respectively match the type of the response message and the device indication information of the target device that correspond to the request message. The sending unit 804 is further configured to send the to-be-forwarded response message to the service instance. Further, the core network interface device may further include the generation unit 803, configured to generate a message transmission entry. The message transmission entry includes the identifier of the service instance, and the type of the response message and the device indication information of the target device that correspond to the request message. The processing unit 806 is specifically configured to obtain the identifier of the service instance in the message transmission entry when the type of the to-be-forwarded response message and the device indication information of the source device respectively match the type of the response message and the device indication information of the target device that correspond to the request message and are in the message transmission entry. The sending unit 804 is further configured to send the to-be-forwarded response message to the service instance.

It should be noted that unit division in the embodiments of the present invention is an example, and is merely logical function division. There may be another division manner in actual implementation. Functional units in the embodiments of the present invention may be integrated into one processing unit, or each of the units may exist alone physically, or two or more units may be integrated into one unit. For example, in the foregoing embodiment, the first obtaining unit and the second obtaining unit may be a same unit or different units. The integrated unit may be implemented in a form of hardware, or may be implemented in a form of a software functional unit.

Figure 9:
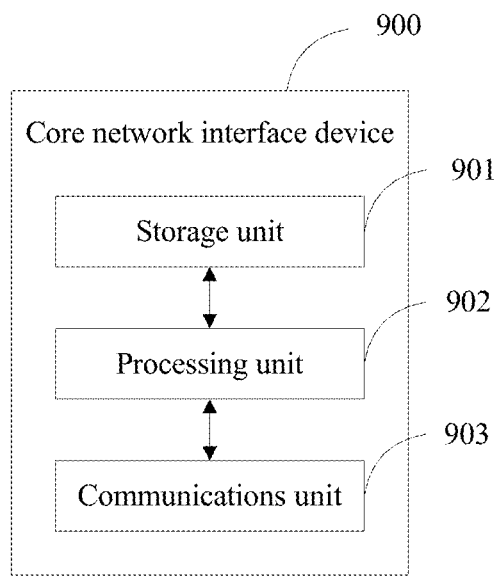
FIG. 9 is a schematic structural diagram of another core network interface device according to an embodiment of the present invention.

When the integrated unit is used, FIG. 9 is another possible schematic structural diagram of a core network interface device in the foregoing embodiment. A core network interface device 900 may also implement the function of the external interface function module in the core network control plane architecture shown in FIG. 3 or FIG. 5.

The core network interface device 900 includes a processing unit 902 and a communications unit 903. The processing unit 902 is configured to control and manage an action of the core network interface device. For example, the processing unit 902 is configured to support the core network interface device in performing processes 601 to 606 in FIG. 6, processes 702, 703, 705, and 706 in FIG. 7, and/or another process used for the technology described in this specification. The communications unit 903 is configured to support the core network interface device in communicating with another network entity, for example, communicating with a function module or a network entity shown in FIG. 3 or FIG. 5. The core network interface device may further include a storage unit 901, configured to store program code and data of the core network interface device.

The processing unit 902 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the present invention. Alternatively, the processor may be a combination of processors implementing a computing function, for example, a combination of one or more microprocessors or a combination of a DSP and a microprocessor. The communications unit 903 may be a transceiver. The storage unit 901 may be a memory.

Figure 10:
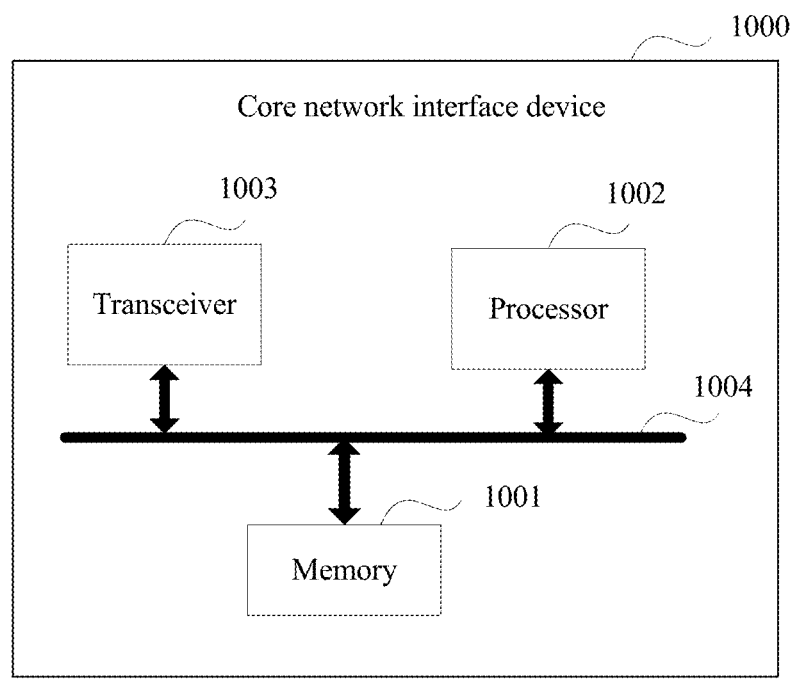
FIG. 10 is a schematic structural diagram of still another core network interface device according to an embodiment of the present invention.

When the processing unit 902 is a processor, the communications unit 903 is a transceiver, and the storage unit 901 is a memory, the core network interface device in this embodiment of the present invention may be a core network interface device shown in FIG. 10.

Referring to FIG. 10, the core network interface device includes a processor 1002, a transceiver 1003, a memory 1001, and a bus 1004. The transceiver 1003, the processor 1002, and the memory 1001 are interconnected by using the bus 1004. The bus 1004 may be a peripheral component interconnect PCI bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

Method or algorithm steps described in combination with the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium and may write information into the storage medium. Certainly, the storage medium may be a constituent part of the processor. The processor and the storage medium may be located in the ASIC. In addition, the ASIC may be located in the core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A message transmission method, comprising:
   receiving, by a core network interface device, a request message sent by a service instance;
   obtaining, by the core network interface device, an identifier of the service instance that sends the request message, and a type of a response message and device indication information of a target device that correspond to the request message;
   sending, by the core network interface device, the request message to the target device;
   after receiving a to-be-forwarded response message, obtaining, by the core network interface device, a type of the to-be-forwarded response message and device indication information of a device that sends the to-be-forwarded response message; and
   obtaining, by the core network interface device, the identifier of the service instance, and sending the to-be-forwarded response message to the service instance when the type of the to-be-forwarded response message and the device indication information of the device that sends the to-be-forwarded response message respectively match the type of the response message and the device indication information of the target device that correspond to the request message.

2. The method according to claim 1, wherein the device indication information of the target device is an identifier of the target device, and the obtaining, by the core network interface device, device indication information of the target device comprises:
   receiving, by the core network interface device, the identifier of the target device that is sent by the service instance; or obtaining, by the core network interface device, the identifier of the target device that is comprised in the request message.

3. The method according to claim 1, wherein the device indication information of the target device is an identifier of a channel between the core network interface device and the target device, and the obtaining, by the core network interface device, device indication information of the target device comprises:
   obtaining, by the core network interface device, an identifier of the target device that corresponds to the request message;
   retrieving, by the core network interface device from a preset correspondence between a device identifier and a channel identifier, a channel identifier corresponding to the identifier of the target device; and
   when the channel identifier corresponding to the identifier of the target device is retrieved, using, by the core network interface device, the channel identifier as the identifier of the channel between the core network interface device and the target device; or
   when the channel identifier corresponding to the identifier of the target device is not retrieved, establishing, by the core network interface device, the channel between the core network interface device and the target device, and obtaining the identifier of the channel between the core network interface device and the target device.

4. The method according to claim 1, wherein the sending, by the core network interface device, the request message to the target device comprises:
   determining, by the core network interface device, the target device based on the device indication information of the target device;
   selecting, by the core network interface device, a corresponding first communications protocol based on a type of the target device; and
   encapsulating, by the core network interface device, the request message based on the first communications protocol, and sending the encapsulated request message to the target device.

5. The method according to claim 1, wherein the obtaining, by the core network interface device, a type of the to-be-forwarded response message comprises:
   determining, by the core network interface device based on the device indication information of the device that sends the to-be-forwarded response message, the device that sends the to-be-forwarded response message;
   selecting, by the core network interface device, a corresponding second communications protocol based on a type of the device that sends the to-be-forwarded response message;
   decapsulating, by the core network interface device, the to-be-forwarded response message based on the second communications protocol; and
   obtaining, by the core network interface device, the type of the to-be-forwarded response message based on the decapsulated to-be-forwarded response message.

6. The method according to claim 1, wherein
   the sending, by the core network interface device, the to-be-forwarded response message to the service instance comprises:
   sending, by the core network interface device, the decapsulated to-be-forwarded response message to the service instance.

7. The method according to claim 1, wherein the obtaining, by the core network interface device, a type of a response message corresponding to the request message comprises:
   receiving, by the core network interface device, the type that is of the response message corresponding to the request message and that is sent by the service instance; or
   obtaining, by the core network interface device, a type of the request message, and determining, based on a preset correspondence between a type of a request message and a type of a response message, the type of the response message corresponding to the request message.

8. The method according to claim 1, wherein the method further comprises:
   generating, by the core network interface device, a message transmission entry, wherein the message transmission entry comprises the identifier of the service instance, and the type of the response message and the device indication information of the target device that correspond to the request message; and
   the obtaining, by the core network interface device, the identifier of the service instance, and sending the to-be-forwarded response message to the service instance when the type of the to-be-forwarded response message and the device indication information of the device that sends the to-be-forwarded response message respectively match the type of the response message and the device indication information of the target device that correspond to the request message comprises: obtaining, by the core network interface device, the identifier of the service instance in the message transmission entry, and sending the to-be-forwarded response message to the service instance when the type of the to-be-forwarded response message and the device indication information of the device that sends the to-be-forwarded response message respectively match the type of the response message and the device indication information of the target device that correspond to the request message and are in the message transmission entry.

9. The method according to claim 8, wherein after the sending, by the core network interface device, the to-be-forwarded response message to the service instance, the method further comprises:
   deleting, by the core network interface device, the message transmission entry.

10. A core network interface device, wherein the core network interface device comprises a processing unit and a communications unit, wherein
    the processing unit is configured to: receive, by using the communications unit, a request message sent by a service instance;
    obtain an identifier of the service instance that sends the request message, and a type of a response message and device indication information of a target device that correspond to the request message;
    after receiving a to-be-forwarded response message by using the communications unit, obtain a type of the to-be-forwarded response message and device indication information of a device that sends the to-be-forwarded response message; and
    obtain the identifier of the service instance, and send the to-be-forwarded response message to the service instance by using the communications unit when the type of the to-be-forwarded response message and the device indication information of the device that sends the to-be-forwarded response message respectively match the type of the response message and the device indication information of the target device that correspond to the request message.

11. The core network interface device according to claim 10, wherein the device indication information of the target device is an identifier of the target device; and
the processing unit is specifically configured to receive, by using the communications unit, the identifier of the target device that is sent by the service instance; or the processing unit is specifically configured to obtain the identifier of the target device that is comprised in the request message.

12. The core network interface device according to claim 10, wherein the device indication information of the target device is an identifier of a channel between the core network interface device and the target device; and
the processing unit is specifically configured to: obtain an identifier of the target device that corresponds to the request message; retrieve, from a preset correspondence between a device identifier and a channel identifier, a channel identifier corresponding to the identifier of the target device; and when the channel identifier corresponding to the identifier of the target device is retrieved, use the channel identifier as the identifier of the channel between the core network interface device and the target device; or when the channel identifier corresponding to the identifier of the target device is not retrieved, establish the channel between the core network interface device and the target device, and obtain the identifier of the channel between the core network interface device and the target device.

13. The core network interface device according to claim 10, wherein
the processing unit is specifically configured to: determine the target device based on the device indication information of the target device; select a corresponding first communications protocol based on a type of the target device; and encapsulate the request message based on the first communications protocol, and send the encapsulated request message to the target device by using the communications unit.

14. The core network interface device according to claim 10, wherein
the processing unit is specifically configured to: determine, based on the device indication information of the device that sends the to-be-forwarded response message, the device that sends the to-be-forwarded response message; select a corresponding second communications protocol based on a type of the device for the to-be-forwarded response message; decapsulate the to-be-forwarded response message based on the second communications protocol; and obtain the type of the to-be-forwarded response message based on the decapsulated to-be-forwarded response message.

15. The core network interface device according to claim 10, wherein
the processing unit is specifically configured to send the decapsulated to-be-forwarded response message to the service instance by using the communications unit.

16. The core network interface device according to claim 10, wherein
the processing unit is specifically configured to receive, by using the communications unit, the type that is of the response message corresponding to the request message and that is sent by the service instance; or the processing unit is specifically configured to: obtain a type of the request message, and determine, based on a preset correspondence between a type of a request message and a type of a response message, the type of the response message corresponding to the request message.

17. The core network interface device according to claim 10, wherein
the processing unit is further configured to generate a message transmission entry, wherein the message transmission entry comprises the identifier of the service instance, and the type of the response message and the device indication information of the target device that correspond to the request message; and
the processing unit is specifically configured to: obtain the identifier of the service instance in the message transmission entry, and send the to-be-forwarded response message to the service instance by using the communications unit when the type of the to-be-forwarded response message and the device indication information of the device that sends the to-be-forwarded response message respectively match the type of the response message and the device indication information of the target device that correspond to the request message and are in the message transmission entry.

18. The core network interface device according to claim 17, wherein
the processing unit is further configured to delete the message transmission entry after sending the to-be-forwarded response message to the service instance by using the communications unit.

* * * * *